3,156,657
PROCESS FOR PREPARING A CATALYST USEFUL FOR REMOVING CARBON MONOXIDE FROM HYDROGEN-CONTAINING GASES
Philip C. Pinder, Sway, Derek G. Turpin, Lymington, and Jan M. Popiel, Hythe, near Southampton, England, assignors to Esso Research and Engineering Company, a corporation of Delaware
No Drawing. Filed Feb. 19, 1959, Ser. No. 794,264
Claims priority, application Great Britain Mar. 6, 1958
2 Claims. (Cl. 252—440)

This invention relates to a process of methanisation of a carbon monoxide-containing gas, and also relates to catalyst compositions suitable for catalysing such processes. The invention is particularly suitable for the methanisation of gas mixtures containing low molecular weight hydrocarbons.

The removal of sulphur contaminants from petroleum distillates is one of the important tasks confronting the petroleum refiner. Modern practice favours processes involving catalytic hydrodesulphurisation. Hydrodesulphurisation involves a process in which a mixture of the sulphur-containing hydrocarbon feed and hydrogen is passed over a sulphur resistant catalyst under suitable conditions to convert the sulphur to hydrogen sulphide. Oxides of cobalt and mixtures of cobalt oxide and molybdenum oxide are the most useful components of a hydrodesulphurisation catalyst, but are sensitive to the presence of carbon monoxide in the process gases.

Thus when using CO sensitive hydrodesulphurisation catalysts it is necessary to remove carbon monoxide from the hydrogen gas used for hydrodesulphurisation processes. Carbon monoxide may be removed from hydrogen-containing feeds by a process of methanisation whereby carbon monoxide is converted to methane in the presence of a catalyst. Catalysts suitable for such processes using hydrogen gas streams free from low molecular weight hydrocarbons are well-known, and are usually high nickel-containing catalysts supported on a base, e.g., chromium oxide, china clay, kieselguhr or alumina, and which may contain a promoter. The nickel contents of such catalysts usually range from 20% to 45% of nickel oxide. In general, this methanisation process may be satisfactorily accomplished when the hydrogen-containing feed does not contain hydrocarbons.

In petroleum hydroforming processes, cyclisation and aromatisation of paraffins takes place with the formation of hydrogen. For example, the products from a hydroformer consist of hydrogen, low molecular weight gaseous hydrocarbons, and a liquid product of enhanced octane number which contains aromatic compounds. The gaseous product separated from such a hydroforming reactor is referred to herein as "tail gas." This tail gas provides an economical source of hydrogen for refinery hydroesulphurisaiton processes. However, such tail gases often contain carbon monoxide impurities which may originate from traces of oxygen in the liquid feed, or from impurities carried over with the regenerated catalyst. As mentioned above, it is necessary to remove these carbon monoxide impurities before using the tail gas in a hydrofining process.

However, such tail gases also contain low molecular weight hydrocarbons, i.e., $C_1$ to $C_5$ and trace amounts of $C_6$ hydrocarbons, and when subjected to a methanisation process using a conventional methanisation catalyst hydrocracking of low molecular weight hydrocarbons i.e., $C_2$ to $C_5$ will take place, resulting in the formation of methane. These hydrocracking reactions are exothermic and result in an increase in the catalyst temperature to such an extent that the catalyst rapidly becomes inactivated, due both to temperature effects and to carbon deposition on the catalyst.

The present invention is based on the discovery that hydrogen-containing gases which also contain CO and low molecular weight hydrocarbons may be methanised in the presence of a catalyst as hereinafter described, whereby substantially all the CO in the gas may be converted to methane without concomitant hydrocracking of the low molecular weight hydrocarbons, thus maintaining the activity of the catalyst.

The catalyst suitable for the methanisation process according to the present invention is a nickel-containing catalyst which is characterised in that the nickel content is substantially lower than that which has hitherto been used, and that the catalyst composition also contains magnesium oxide and critical proportions of sulphate radical.

The composition of the catalysts suitable for use in the present invention are as follows, all percentages being by weight based on the total composition:

|  | Broad Range, Percent | Preferred Range, Percent |
| --- | --- | --- |
| Nickel oxide* | 2–15 | 5–11 |
| Magnesium oxide | 0.5–7 | 1–3 |
| Sulphate (as $SO_3$) | 0.2–2 | 0.3–0.5 |
| Carrier base | 77–97.3 | 85.5–93.7 |

*Nickel oxide is the most commonly used form of nickel compound in such catalysts. The corresponding active nickel content is 1.6% to 11.8% preferably 4% to 8.8%.

The methanisation of CO-containing gases, e.g., hydroformer tail gases, e.g., using such catalysts is achieved by passing the gas in contact with catalyst at an elevated temperature, for instance, at a temperature of about 200° F.–400° F. When new catalyst is used, the nickel oxide any be produced by reduction with a hydrogen-containing gas. Thus when hydroformer tail-gas is methanised the tail gas itself can achieve the necessary reduction.

The catalyst base may be any conventional base, for instance chromium oxide, china clay or kieselguhr. Alumina is preferably used as the base, particularly alumina with a surface area of at least 100 sq. metres per gram. Preferred aluminas are gamma, theta, omega or particularly eta alumina.

The catalyst composition may be prepared by impregnation of the catalyst base with dilute aqueous solutions of nickel and magnesium salts, or by co-precipitation from such solutions, e.g., with a carbonate. Thus suitable salts are the nitrates, manganates, vanadates, formates, oxalates, and acetates. The impregated base may be spray dried and ignited. The product is compounded into pellets and dried. It is to be appreciated that other promoters or inert diluents can be included in the catalyst composition.

An example of the preparation of a catalyst composition suitable for use as a methanisation catalyst according to this invention is as follows:

An activated alumina can be prepared by precipitating a hydrous aluminum oxide from aluminum sulphate solution with a small excess of ammonium hydroxide (about 0.1 N excess $NH_4OH$). The washed product is dried and calcined at 1000–1400° F. until it contains 1–5 percent of volatile matter. The washing is controlled so that the finished alumina contains about 0.90% of residual sulfate. (Alternatively this alumina may be prepared by precipitating sodium aluminate with sulfuric acid or aluminum sulfate, or by reacting an aluminum alcoholate with water containing this amount of sulfate as $H_2SO_4$.)

The calcined product is screened to 4 to 8 mesh granules. 85.9 pounds of these granules (4% $H_2O$) are impregnated with a solution of 39 lbs. $Ni(NO_3)_2 \cdot 6H_2O$ and 12.7 lbs. $Mg(NO_3)_2 \cdot 6H_2O$ in a volume of water equal to 70 percent of the volume of the granules. The product is dried and calcined three hours at 1000° F.

The resulting catalyst had the following composition:

| | Parts by weight |
|---|---|
| Alumina | 82.5 |
| Nickel oxide | 10 |
| Magnesium oxide | 2 |
| Sulphate | 0.75 |

Organic acid salts may be used instead of nitrates. $H_2SO_4$ may be included in the impregnating solution when the washed alumina contains less then the desired sulfate content. The catalyst may also be pilled or extruded.

This invention may be illustrated by the following experiments and examples thereof.

A number of catalysts according to the prior art were contacted with tail gas from a fluid hydroformer, at various temperatures. The tail gas contained approximately 50% of hydrogen, 45% of $C_1$–$C_5$ hydrocarbons, 0.5% CO and the rest consisting of inert gases. The efficiency of methanisation was determined by noting the temperatures at which the carbon monoxide content of the gas was reduced to 0.01% by volume. Further the hydrocracking behaviour at various temperatures was established by conducting gas analyses using a mass spectrometer, the onset of hydrocracking being determined by a decrease in the proportion of $C_2$–$C_5$ hydrocarbons in the gas. The above procedure was then reacted for various other catalyst compositions containing different proportions of magnesium oxide and sulphate. The results of these experiments are shown in the accompanying table.

vated temperatures. The reaction temperature may be controlled by the temperatures of the feed gas streams, e.g,. at temperatures of about 200 to 700° F. Reaction pressures can be from about 1 atmosphere to 1500 p.s.i. and space velocities may be about 300 to 5000 v./hr./v.

Using the catalyst according to the present invention not only enables methanisation to be carried out without excessive hydrocracking of any light hydrocarbons present, but also decreases the oxygen content of the feed going to the hydrofiner. Trace amounts of oxygen can cause discolouration of the hydrofined petroleum product. Thus use of the catalyst of the present invention in hydrogen-containing feed streams for hydrofining yields hydrofined petroleum products of improved colour stability.

What is claimed is:

1. A process for preparing a catalyst consisting essentially of about 7.5% NiO, about 2% MgO, about 0.4% of sulfate and the rest alumina base which is manufactured from aluminum sulfate and contains residual sulfate which provides all the sulfate defined in said catalyst, which comprises impregnating said alumina with an aqueous solution of selected amounts of nickel nitrate and magnesium nitrate to give the above-mentioned composition upon drying and calcining, drying the resulting mixture and calcining the resulting catalyst to form the oxides of nickel and magnesium at a temperature of about 1000° F. for about 3 hours.

2. A process for preparing a catalyst consisting essentially of between about 5% and 11% of NiO, between about 1 and 3% of MgO, and between about 0.3 and 0.5% of sulfate and the rest alumina which is manu-

| Catalyst | Catalyst Base | Composition, weight percent | | | Methanisation Performance, °F. | Hydrocracking Performance | | | |
|---|---|---|---|---|---|---|---|---|---|
| | | | | | | SV 2074, v./hr./v. | | SV 497, v./hr./v. | |
| | | NiO | Sulfate | MgO | | At 520° F. | At 600° F. | At 410° F. | At 520° F. |
| C' | Chromium Oxide | 40 | Trace | | 340 | N.H. | H. | H. | H. |
| A | Kieselguhr | 40 | 0.18 | | 338 | H. | | | |
| $C_2$ | China Clay | 20 | Trace | 2 | 244 | H. | | | |
| B | Alumina | 8 | 2.5 | | Above 640 | N.H. | N.H. | | |
| C | do | 8 | 0.25 | | 340 | H. | | | |
| D | do | 4 | 0.5 | | 275 | N.H. | | N.H. | H. |
| X | do | 7.5 | 0.4 | 2 | 311 | N.H. | N.H. | N.H. | N.H. |

SV=Space Velocity.
X=Catalyst according to invention.
N.H.=No hydrocracking.
H.=Hydrocracking.

It will be seen from the above table that the C' catalyst, containing 40% by weight of nickel oxide, results in substantial hydrocracking. Catalyst "A" containing in addition a proportion of sulphate aggravated the hydrocracking and a similar effect was produced by the $C_2$ catalyst in which the nickel content was halved and which contained magnesia. Catalyst "B" which contained a relatively low proportion of nickel and a relatively high proportion of sulphate resulted in improved hydrocracking inhibition, but the methanisation of CO was suppressed, whereas reducing the proportion of sulphate in catalyst "C" resulted in the onset of hydrocracking. Catalyst "D" containing very low nickel and some sulphate still produced hydrocracking under severe conditions of low space velocity and high temperatures. Catalyst "X" which had a composition according to the invention resulted in good methanisation accompanied by an absence of hydrocracking effects even under severe conditions.

The methanisation of CO-containing gases, e.g., hydroformer tail gases from fluid hydroforming processes, using catalysts according to this invention can be achieved by passing the gases in contact with the catalyst at elevated temperatures.

factured from aluminum sulfate and contains residual sulfate which provides all the sulfate defined in said catalyst, which comprises impregnating said alumina with an aqueous solution of selected amounts of nickel nitrate and magnesium nitrate to give the above-mentioned composition upon drying and calcining, drying the resulting mixture and calcining the resulting catalyst to form the oxides of nickel and magnesium at a temperature of about 1000° F. for about 3 hours.

References Cited in the file of this patent

UNITED STATES PATENTS

| 2,229,166 | Brandt | Jan. 21, 1941 |
| 2,251,000 | Pyzel | July 29, 1941 |
| 2,588,359 | Chitwood et al. | Mar. 11, 1952 |
| 2,627,506 | Hunter et al. | Feb. 3, 1953 |
| 2,732,329 | Doumani | Jan. 24, 1956 |
| 2,871,200 | Doumani | Jan. 27, 1959 |
| 2,977,326 | Nixon | Mar. 28, 1961 |

FOREIGN PATENTS

| 774,283 | Great Britain | May 8, 1957 |